(12) United States Patent
Lai et al.

(10) Patent No.: US 12,061,315 B2
(45) Date of Patent: Aug. 13, 2024

(54) COMPOSITE BARRIER FILM FOR ATTACHING TO A QUANTUM-DOT FILM AND THE METHOD TO MAKE THE SAME

(71) Applicant: UBRIGHT OPTRONICS CORPORATION, Taoyuan (TW)

(72) Inventors: Chien-Chih Lai, Taoyuan (TW); Ming-Te Huang, Taoyuan (TW); Huiyong Chen, Taoyuan (TW); Lung-Pin Hsin, Taoyuan (TW)

(73) Assignee: UBRIGHT OPTRONICS CORPORATION, Taoyuan County (TW)

( * ) Notice: Subject to any disclaimer, the term of this patent is extended or adjusted under 35 U.S.C. 154(b) by 215 days.

(21) Appl. No.: 17/577,407

(22) Filed: Jan. 18, 2022

(65) Prior Publication Data
US 2022/0236456 A1 Jul. 28, 2022

Related U.S. Application Data

(60) Provisional application No. 63/141,971, filed on Jan. 26, 2021.

(51) Int. Cl.
| | | |
|---|---|---|
| G02B 1/14 | (2015.01) | |
| B29C 48/08 | (2019.01) | |
| B29C 48/18 | (2019.01) | |
| B29D 7/01 | (2006.01) | |
| B32B 7/023 | (2019.01) | |
| B32B 7/12 | (2006.01) | |
| B32B 27/06 | (2006.01) | |
| B32B 27/18 | (2006.01) | |
| B32B 27/32 | (2006.01) | |
| B32B 27/36 | (2006.01) | |
| B32B 33/00 | (2006.01) | |

(Continued)

(52) U.S. Cl.
CPC ............... *G02B 1/14* (2015.01); *B29C 48/08* (2019.02); *B29C 48/18* (2019.02); *B29D 7/01* (2013.01); *B32B 7/023* (2019.01); *B32B 7/12* (2013.01); *B32B 27/06* (2013.01); *B32B 27/18* (2013.01); *B32B 27/32* (2013.01); *B32B 27/36* (2013.01); *B32B 27/365* (2013.01); *B32B 33/00* (2013.01); *B29C 55/12* (2013.01); *B32B 2307/7244* (2013.01); *B32B 2307/7265* (2013.01); *B32B 2323/10* (2013.01); *G02B 5/207* (2013.01); *G02B 5/22* (2013.01)

(58) Field of Classification Search
CPC ......... B29C 48/08; B29C 48/18; B29C 55/12; B29D 7/01; B32B 7/023; B32B 7/12; B32B 27/06; B32B 27/18; B32B 27/32; B32B 27/36; B32B 27/365; B32B 33/00; B32B 2307/7244; B32B 2307/7265; B32B 2323/10; G02B 1/14; G02B 5/207; G02B 5/22
See application file for complete search history.

(56) References Cited

FOREIGN PATENT DOCUMENTS

WO WO-2019069827 A1 * 4/2019 ............. B32B 27/08

* cited by examiner

*Primary Examiner* — Mark R Gaworecki
(74) *Attorney, Agent, or Firm* — Min-Lee Teng (57) ABSTRACT

A composite barrier film, comprising: an ultra-thin barrier film, wherein the ultra-thin barrier film is capable of being water-resistant and oxygen-resistant; and a protection film, being attached on the ultra-thin barrier film for increasing the stiffness of the ultra-thin barrier film, wherein a thickness of the ultra-thin barrier film is less than a thickness of the protection film.

20 Claims, 8 Drawing Sheets

450

(51) Int. Cl.
*B29C 55/12* (2006.01)
*G02B 5/20* (2006.01)
*G02B 5/22* (2006.01)

FIG. 4D providing a ultra-thin barrier film, wherein the ultra-thin barrier film is capable of being water-resistant and oxygen-resistant for protecting a quantum-dot film from water and oxygen — S501 attaching a protection film to the ultra-thin barrier film, wherein a thickness of the ultra-thin barrier film is less than a thickness of the protection film, wherein the composite barrier film is formed separately from the quantum-dot film — S502

COMPOSITE BARRIER FILM FOR ATTACHING TO A QUANTUM-DOT FILM AND THE METHOD TO MAKE THE SAME

CROSS-REFERENCE TO RELATED APPLICATION

This application claims the benefit of U.S. provisional patent application No. 63/141,971, filed on Jan. 26, 2021, which is hereby incorporated herein by reference.

BACKGROUND OF THE INVENTION

1. Field of the Invention

The present invention relates to an optical film, and more particularly to a quantum-dot optical film.

2. Description of Related Art

The quantum dot is a semiconductor particle having a nanometer size and a spherical shape. The colored spectrum can be generated when the quantum dots are excited by light or electricity. The color of the exciting light is determined according to the material and the size of the quantum dot. Because quantum dots can change the color of the light emitted by a light source, they can be widely used in display devices, such as liquid crystal displays (LCD). The quantum dots can enhance the color gamut, the color, and the brightness of the display device such that the display device can have a color gamut of about 110% NTSC (National Television System Committee).

The quantum dot is commonly made of IV, II-VI, IV-VI, or III-V elements, such as Si, Ge, CdS, CdSe, CdTe, ZnSe, PbS, PbSe, InP, and InAs, wherein the most widely used are mainly CdSe and InP. QD Vision mainly uses CdSe as the material of the quantum dot, Nanoco mainly uses InP as the material of the quantum dot and Nanosys uses a combination of CdSe and InP as the material of the quantum dot.

In recent years, the display products of 3C mobile devices such as tablets and laptops have become more and more popular, and the design of the backlight module of the display of the 3C mobile devices is towards light and thin, the large size of the screen, narrow bezel of the screen, and high color saturation. At the same time, in order to improve the high color saturation, the ultra-thin quantum dot film is used in the backlight module.

A conventional method to increase the stiffness of a film is to print a high-hardness material on the back of the film, however, this method will increase the thickness of the film along with warping and other problems, and the method can only improve the stiffness to a certain degree.

Furthermore, it is difficult to print or coat materials on an ultra-thin film. To print a high-hardness material on the back of the ultra-thin film is a tough job by itself, and it will cause problems such as MD lines and wrinkles in the ultra-thin film.

Accordingly, the present invention proposes a new solution to overcome the above-mentioned disadvantages.

SUMMARY OF THE INVENTION

The present invention discloses an ultra-thin barrier film with water and oxygen resistance. Because the ultra-thin barrier film is prone to wrinkles, stretch marks, warping, dents, etc. during the QD process, the barrier film stiffness is improved by attaching a protection film to the ultra-thin barrier film before the ultra-thin barrier film is attached to a quantum-dot film, which will greatly enhance the application and popularity of the ultra-thin quantum dot optical film materials in different fields in the future.

The present invention is to develop a process technology for enhancing the stiffness of a barrier film. A layer of film is first attached to the barrier film to increase the overall stiffness and at the same time achieve a protective effect. The film does not need to be torn off during the QD film manufacturing process. After that, it can be shipped directly without additional protection film, which has achieved the advantages of a simplified manufacturing process, improved yield, and reduced cost.

In one embodiment, the present invention discloses a composite barrier film for attaching to a quantum-dot film, said composite barrier film comprising: a barrier film, wherein the barrier film is capable of being water-resistant and oxygen-resistant for protecting the quantum-dot film from water or oxygen; and a protection film, being attached on the barrier film for increasing the stiffness of the barrier film, wherein a thickness of the barrier film is less than a thickness of the protection film, wherein the composite barrier film is formed separately from the quantum-dot film.

In one embodiment, an adhesive material is on a bottom surface of the protection film so as to adhere the protection film to the barrier film.

In one embodiment, an adhesive film is attached on a bottom surface of the protection film so as to adhere the protection film to the barrier film.

In one embodiment, the thickness of the barrier film is in a range of 5-25 um, and the thickness of the protection film is in a range of 40~100 um.

In one embodiment, the thickness of the barrier film is in a range of 5-25 um, and the thickness of the protection film is in a range of 60~70 um.

In one embodiment, the protection film comprises PET (polyethylene terephthalate).

In one embodiment, the protection film comprises PP (Polypropylene).

In one embodiment, the barrier film is a food packaging film that is capable of being water-resistant and oxygen-resistant.

In one embodiment, a D value of the stiffness of the composite barrier film is not less than 7.8 cm.

In one embodiment, the protection film is made of at least one of the following materials: PP, PE, PP & PE, PET, and PC.

In one embodiment, the quantum-dot film comprising a binder and a plurality of quantum dots dispersed in the binder, wherein the plurality of quantum dots are capable of being water-resistant and oxygen-resistant, wherein the ultra-thin barrier film is a food packaging film.

In one embodiment, the present invention discloses a method to form a composite barrier film for attaching to a quantum-dot film, said composite barrier film comprising: providing an ultra-thin barrier film, wherein the ultra-thin barrier film is capable of being water-resistant and oxygen-resistant for protecting the quantum-dot film from water or oxygen; and attaching a protection film to the ultra-thin barrier film, wherein a thickness of the ultra-thin barrier film is less than a thickness of the protection film, wherein the composite barrier film is formed separately from the quantum-dot film.

The detailed technology and above preferred embodiments implemented for the present invention are described in the following paragraphs accompanying the appended drawings for people skilled in this field to well appreciate the features of the claimed invention.

BRIEF DESCRIPTION OF THE DRAWINGS

The foregoing aspects and many of the accompanying advantages of this invention will become more readily appreciated as the same becomes better understood by reference to the following detailed description when taken in conjunction with the accompanying drawings, wherein.

DETAILED DESCRIPTION OF THE ILLUSTRATED EMBODIMENTS

The detailed explanation of the present invention is described as follows. The described preferred embodiments are presented for purposes of illustrations and description and they are not intended to limit the scope of the present invention.

The quantum dots in the quantum-dot film are highly sensitive to degradation, so the quantum dot-film should have excellent barrier properties to prevent damage to the quantum dots in the quantum-dot film caused by oxygen or water, which degrades the performance of the quantum-dot film. Conventionally, see FIG. 1, the quantum-dot film 100 includes a first barrier layer 102, a second barrier layer 103, and a binder 101B between the first barrier layer 102 and the second barrier layer 103. A plurality of quantum dots 101A are dispersed in the binder 101B. The barrier layers 102, 103 can protect the quantum dots 101A from damage caused by oxygen or water.

Figure 1:
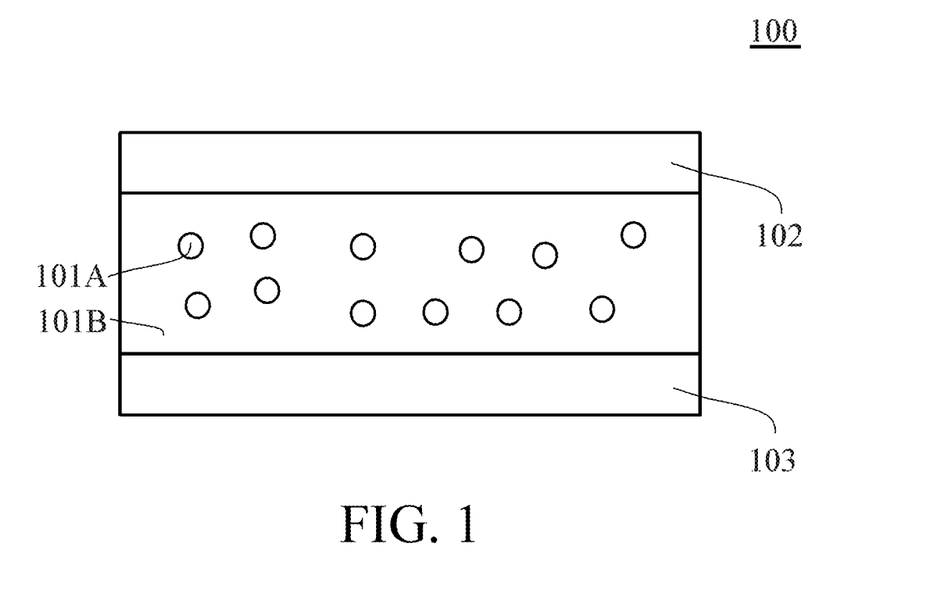
FIG. 1 illustrates a schematic cross-sectional view of a quantum-dot film.

However, the barrier layers 102, 103 will increase the total thickness and the manufacturing complexity of the quantum-dot film 100.

Figure 2:
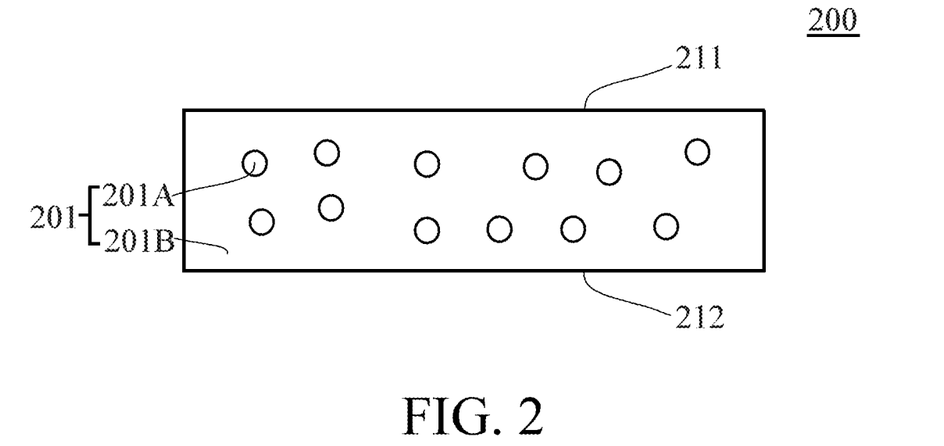
FIG. 2 illustrates a schematic cross-sectional view of the quantum-dot film in the present invention.

FIG. 2 illustrates a schematic cross-sectional view of the quantum-dot film 200 in the present invention. The quantum-dot film 200 comprises a quantum-dot layer 201. The quantum-dot layer 201 comprises a binder 201B and a plurality of quantum dots 201A dispersed in the binder 201B. The thickness of the quantum-dot layer 201 can be in the range from 25 μm to 350 μm. The quantum-dot layer 201 has a first major surface 211 and a second major surface 212 opposite to the first major surface 211.

The quantum dots 201A have high stability when exposed to high temperature or heat, so the surface of the quantum dots 201A can be specially treated to improve the ability to resist environmental damage caused by water and oxygen; therefore, the quantum dots 201A are capable of being water-resistant and oxygen-resistant enough without a barrier layer formed over/on each of the first major surface 211 and the second major surface 212 of the quantum-dot layer 201.

The quantum-dot layer 201 is capable of being supported by itself without a supporting layer formed over each of the first major surface 211 and the second major surface 212 of the quantum-dot layer 201. Therefore, the material of the binder 201B of the quantum-dot layer 201 should be selected such that the quantum-dot layer 201 is capable of being supported by itself without a supporting layer formed over each of the first major surfaces 211 and the second major surface 212 of the quantum-dot layer 201. In addition, the material of the binder 201B of the quantum-dot layer 201 should be selected such that the quantum dots 201A in the quantum-dot film 200 is protected from damage caused by oxygen or water. The material of the binder 201B can include at least one of the following: PET (polyethylene terephthalate), PE (polyethylene), PEN (polyethylene naphtholate), PAR (polyacrylate), PC (polycarbonates), and TAC (cellulose triacetate). Preferably, the material is PET (polyethylene terephthalate). The material can be pure PET (polyethylene terephthalate). The material of binder 201B can be unitary or homogeneous.

The quantum dots 201A can comprise green quantum dots and red quantum dots. The material of the quantum dots 201A can comprise CdS, CdSe, CdTe, ZnSe, PbS, PbSe, InP, InAs, InGaP, ZnS, or ZnTe, but the present invention is not limited thereto. The material of the quantum dots 201A can comprise Cd (e.g., CdSe) or be Cd-free (e.g., InP). The concentration of the quantum dots 201A can be in the range from 0.1% to 20%, preferably, from 0.3 to 8%.

In one embodiment, the concentration of the quantum dots 201A in the quantum-dot layer 201 is 0.05-20%.

In one embodiment, the concentration of the quantum dots 201A in the quantum-dot layer 201 is 0.05-8%.

In one embodiment, the thickness of the quantum-dot film is 25-350 um.

Optionally, the quantum-dot film 200 can comprise a plurality of diffusing particles (not shown); the diffusing particles are further provided to increase the uniformity of the quantum dots 201A dispersed in the binder 201B. The material of the diffusing particles can be organic (e.g., PMMA (polymethyl methacrylate), PS (polystyrene), Melamine) or inorganic (e.g., silicon, $SiO_2$, $TiO_2$, $CaCO_3$, $Al_2O_3$, $ZrO_2$). The concentration of the diffusing particles can be in the range from 2% to 40%, preferably, from 5% to 15%.

Figure 3:
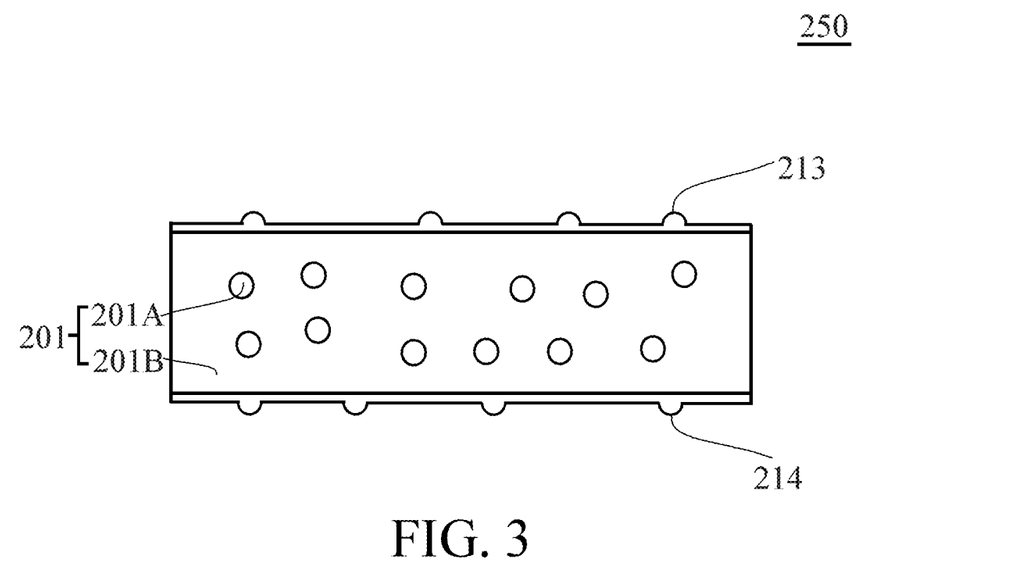
FIG. 3 illustrates a schematic cross-sectional view of the quantum-dot film in the present invention, wherein each of the first major surface and the second major surface of the quantum-dot layer is a structured surface.

Each of the first major surface 211 and the second major surface 212 of the quantum-dot layer 201 can be a structured surface 213, 214 (see the quantum-dot film 250 in FIG. 3). The structured surface 213, 214 can be used for reducing the undesired photo phenomenon, such as Newton's rings. The matt structure can be used to form each of the first major surface 211 and the second major surface 212 of the quantum-dot layer 201.

The manufacturing method for forming the quantum-dot film 200 is described as follows.

The method for forming a quantum-dot film 200 comprises forming a quantum-dot layer 201 comprising a binder 201B and a plurality of quantum dots 201A dispersed in the binder 201B. Forming the quantum-dot layer 201 comprises performing a process on the quantum dots 201A and the material such that the plurality of quantum dots 201A is dispersed in the binder 201B. The process can be a co-extrusion process.

Embodiment A1

The material of the binder 201B can comprise a first portion and a second portion, wherein the quantum dots 201A and the first portion of the material are combined into a first component and the second portion of the material is formed into a second component, wherein the process is performed on the first component and the second component such that the quantum dots 201A are dispersed in the binder 201B. The process can be a co-extrusion process.

For the convenience of explanation, the material of the binder 201B is PET in Embodiment A1 of the invention; however, the present invention is not limited to this case. After the quantum dots 201A are uniformly dispersed by a dispersion process, the quantum dots 201A and a first portion of PET can be combined into a first component (e.g., by the twin-screw extruder or the micro-twin screw extruder). The first component (i.e. QD in PET) can be in the form of a plurality of first chips. The first component may have a high concentration of the quantum dots 201A. The first component may have a better light-emitting effect and a better light-emitting uniformity. The second component can be made of pure PET or have a high concentration of PET. The second component (i.e. PET) can be in the form of a plurality of second chips (i.e. PET chips). The first component and the second component can be formed into the quantum-dot film 200 in the present invention based on a suitable mass ratio thereof (e.g., by the co-extrusion process).

The first component and the second component can be combined into a composite mixture (e.g., by the twin-screw extruder or the micro-twin screw extruder), wherein the process is performed on the composite mixture such that the quantum dots 201A are dispersed in the binder 201B. The composite mixture may have a better light-emitting effect and a better light-emitting uniformity. The process can be a co-extrusion process.

Embodiment A2

The material of the binder 201B can comprise a first portion, a second portion, and a third portion, wherein the quantum dots 201A and the first portion of the material are combined into a first component, the second portion of the material is formed into a second component, and the diffusing particles and the third portion of the material are combined into a third component, wherein the process is performed on the first component, the second component and the third component such that the quantum dots 201A are uniformly dispersed in the binder 201B. The process can be a co-extrusion process.

For the convenience of explanation, the material of the binder 201B is PET in Embodiment A2 of the invention; however, the present invention is not limited to this case. Compared to Embodiment A1 in which the first component and the second component are provided, Embodiment A2 further comprises a third component. After the diffusing particles are uniformly dispersed by a dispersion process, the diffusing particles and the third portion of PET can be combined into a third component (e.g., by the twin-screw extruder or the micro-twin screw extruder). The third component (i.e. diffusing particles in PET) can be in the form of a plurality of third chips. The third component may have a high concentration of diffusing particles. The first component, the second component, and the third component can be formed into the quantum-dot film 200 in the present invention based on a suitable mass ratio thereof (e.g., by the co-extrusion process).

The first component, the second component, and the third component are combined into a composite mixture (e.g., by the twin-screw extruder or the micro-twin screw extruder), wherein the process is performed on the composite mixture such that the quantum dots 201A are uniformly dispersed in the binder 201B. The composite mixture may have a better light-emitting effect and a better light-emitting uniformity. The process can be a co-extrusion process.

The quantum dots 201A can comprise green quantum dots and red quantum dots. The green quantum dots and a portion of PET can be combined into a first sub-component (e.g., by the twin-screw extruder or the micro-twin screw extruder). The red quantum dots and another portion of PET can be combined into a second sub-component (e.g., by the twin-screw extruder or the micro-twin screw extruder). The first sub-component and the second sub-component can be regarded as the first component in each of Embodiment A1 and Embodiment A2.

The process can be a co-extrusion process which is one of the stretch-forming technologies used for film-forming. The stretch-forming technology can be a bi-axially stretch-forming technology. The co-extrusion is a process in which two or more plastic materials, each of which has a property $X_i$, are extruded and combined to form a structure having a combination of the properties $X_1, X_2, \ldots X_N$ (N is an integer and larger than 1) of the two or more plastic materials. When performing the co-extrusion process by using two plastic materials in Embodiment A1, one plastic material can be the first component and the other plastic material can be the second component. When performing the co-extrusion process by using three materials in Embodiment A2, one plastic material can be the first component, another material can be the second component and the other plastic material can be the third component.

Embodiment A2 is further described in detail.

For the convenience of explanation, the material of the binder 201B is PET and the material of the diffusing particles is PMMA in further described Embodiment A2 of the invention; however, the present invention is not limited to this case. Place PET chips in the oven and dry PET chips at 100° C. for 24 hours. Place PMMA beads in the oven and dry PMMA beads at 100° C. for 24 hours. Prepare the first mixture having the green quantum dots and the PET chips. The mass of the green quantum dots is 8 g and the mass of the PET chips is 72 g. Pre-uniform the first mixture and place the first mixture in the twin-screw extruder (or the micro-twin screw extruder, or the micro-extruder). Perform a heat dispersion (or nano-dispersion) process on the first mixture at 280° C. in the twin-screw extruder (by the high shear force) for 10 minutes to form the first sub-component (i.e. GQD in PET). The first sub-component may have a high concentration of the green quantum dots. Prepare the second mixture having the red quantum dots and the PET chips. The mass of the red quantum dots is 20 g and the mass of the PET chips is 72 g. Pre-uniform the second mixture and place the second mixture in the twin-screw extruder (or the micro-twin screw extruder, or the micro-extruder). Perform a heat dispersion (or nano-dispersion) process on the second mixture at 280° C. in the twin-screw extruder (by the high shear force) for 10 minutes to form the second sub-component (i.e. RQD in PET). The second sub-component may have a high concentration of the red quantum dots. The first sub-component and the second sub-component can be regarded as the first component in Embodiment A2. Prepare the third mixture having the PMMA beads and the PET chips. The mass of the PMMA beads is 32 g and the mass of the PET chips is 48 g. Pre-uniform the third mixture and place the third mixture in the twin-screw extruder (or the micro-twin screw extruder, or the micro-extruder). Perform a heat dispersion (or nano-dispersion) process on the third mixture at 280° C. in the twin-screw extruder (by the high shear force) for 10 minutes to form the third component (i.e. PMMA in PET). Prepare the fourth mixture having the first sub-component (i.e. GQD in PET), the second sub-component (i.e. RQD in PET), the third component (i.e. PMMA in PET), and the second component (i.e. PET chips). The mass of the first sub-component is 13 g, the mass of the second sub-component is 6 g, the mass of the third component is 16 g and the second component is 30 g. Place the fourth mixture in the twin-screw extruder (or the micro-twin screw extruder, or the micro-extruder). Perform a heat dispersion (or nano-dispersion) process on the fourth mixture at 280° C. in the twin-screw extruder (by the high shear force) for 10 minutes to form the composite mixture. Finally, the composite mixture is formed into a quantum-dot film 200 (by the hot plate).

In one embodiment, the plurality of quantum dots are dispersed into the spaces between particles of the PET by a micro-twin screw extruder nano-dispersion processing technology.

In one embodiment, a PET co-extrusion and biaxial stretching technology are used to form a PET quantum-dot optical film. The PET quantum-dot optical film does not need to have an additional gas barrier film (gas barrier film) and can still achieve the same anti-environmental test level.

Figure 4A:
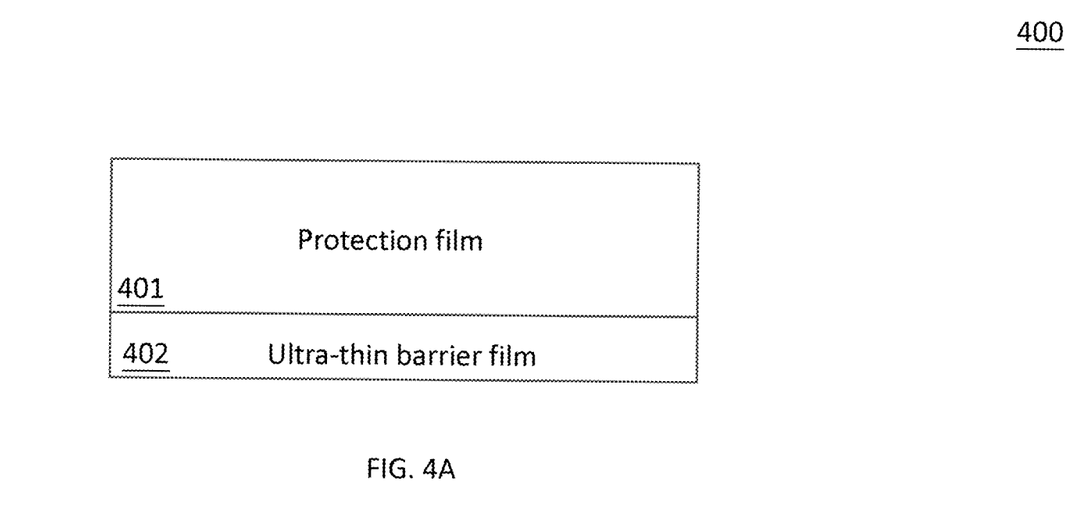
FIG. 4A illustrates a side view of a composite barrier film for attaching to a quantum-dot film.
Figure 4B:
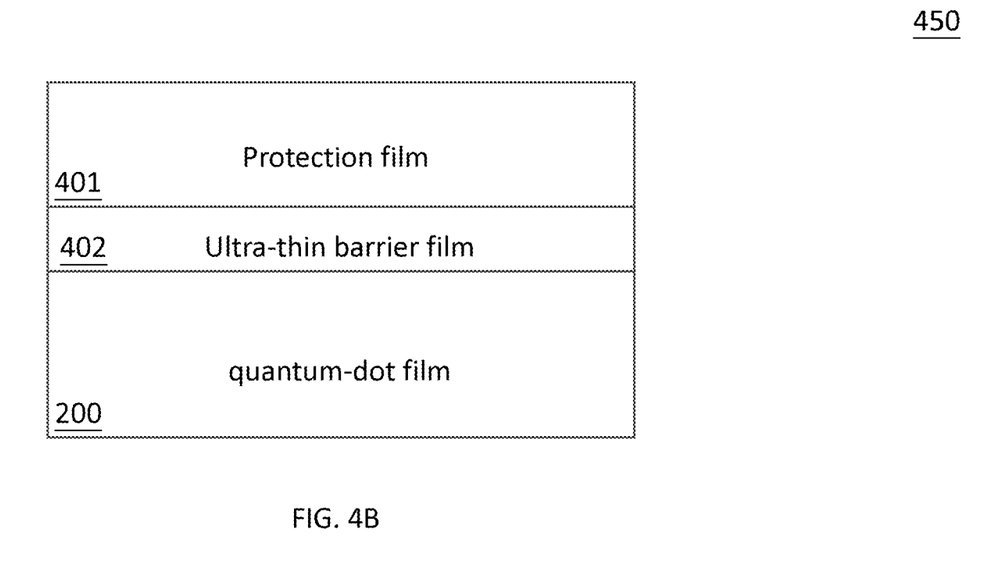
FIG. 4B illustrates a side view of the structure after the composite barrier film is attached to the quantum-dot film.

FIG. 4A illustrates a side view of a composite barrier film 400 for attaching to a quantum-dot film 200, and FIG. 4B illustrates a side view of a composite quantum-dot film 450 after the composite barrier film 400 is attached to the quantum-dot film 200. As shown in FIG. 4A, the composite barrier film 400 comprises: a barrier film such as an ultra-thin barrier film 402, wherein the ultra-thin barrier film 402 is capable of being water-resistant and oxygen-resistant for protecting the quantum-dot film from water or oxygen; and a protection film 401, being attached on the ultra-thin barrier film 402, wherein a thickness of the ultra-thin barrier film 402 is less than a thickness of the protection film 401, wherein the protection film 401 is formed without using the barrier film such as the ultra-thin barrier film 402, and the composite barrier film 400 is formed separately from the quantum-dot film 200. In other words, the protection film 401 is formed separately from the barrier film 402, or the protection film 401 is formed without using the barrier film 402, which means the protection film 401 is not formed by printing or coating a corresponding material on the barrier film such as the ultra-thin barrier film 402.

Please note that the composite barrier film 400 can be attached to any structure having a quantum-dot film such as shown in FIG. 1, FIG. 2, or FIG. 3.

In one embodiment, an adhesive material is on the bottom surface of the protection film to adhere the protection film to the ultra-thin barrier film.

Figure 4C:
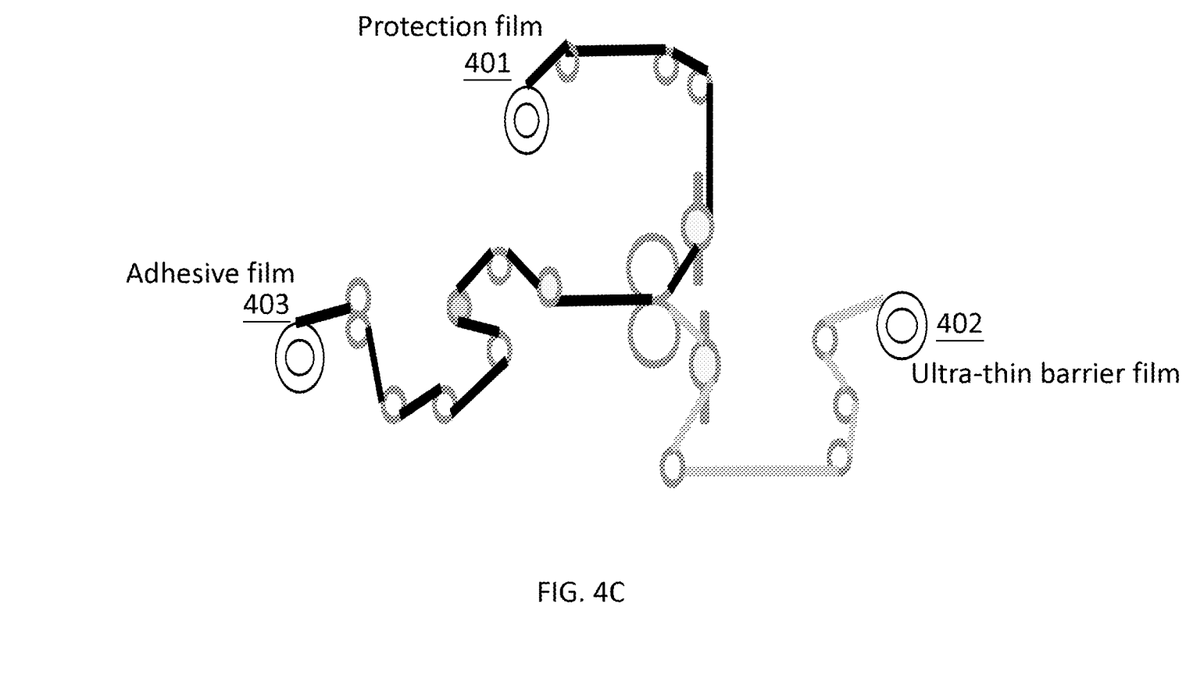
FIG. 4C illustrates an exploded view of a composite barrier film for attaching to a quantum-dot film.

In one embodiment, as shown in FIG. 4C, an adhesive film 403 is located between the protection film 401 and the ultra-thin barrier film 402 to adhere the protection film 401 to the ultra-thin barrier film 402.

In one embodiment, the thickness of the ultra-thin barrier film 402 is in a range of 5-25 um, and the thickness of the protection film 401 is in a range of 40~100 um.

In one embodiment, the thickness of the ultra-thin barrier film 402 is in a range of 5-25 um, and the thickness of the protection film 401 is in a range of 60~70 um.

In one embodiment, the protection film comprises PET (polyethylene terephthalate).

In one embodiment, the protection film 401 comprises PP.

In one embodiment, the ultra-thin barrier film 402 is a food packaging film that is capable of being water-resistant and oxygen-resistant.

Figure 4D:
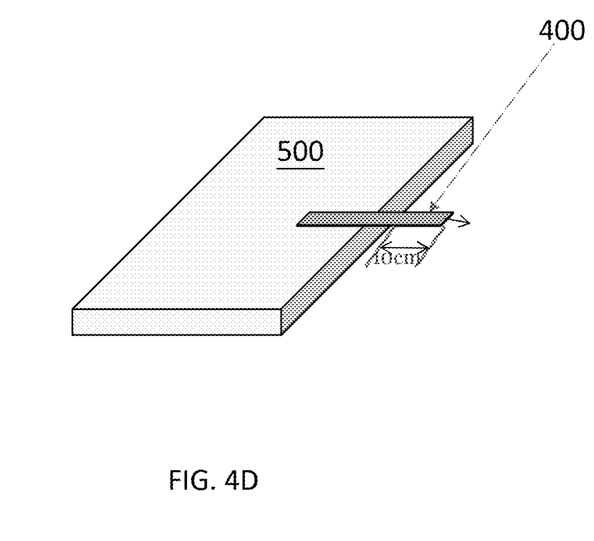
FIG. 4D and FIG. 4E illustrates a test method to test the stiffness of a composite barrier film.
Figure 4E:
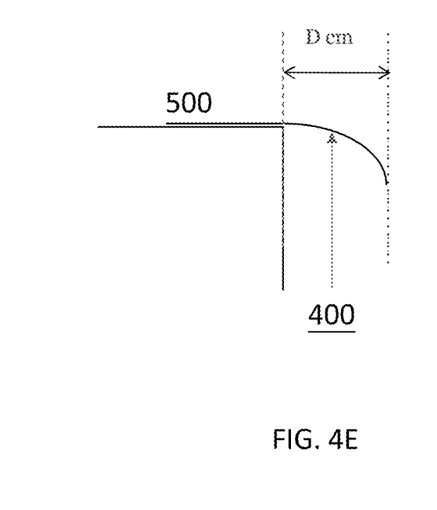

The stiffness test method is used to test the membrane by cutting the composite barrier film 400 into a size of 5*40 cm, placing the composite barrier film 400 on a marble table 500 with one end extending 10 cm from the marble table 500, as shown in FIG. 4D, and measuring a horizontal distance D between the bent end of the composite barrier film 400 and the edge of the marble table 500 and the horizontal distance D will be used as a stiffness value of the composite barrier film 400, as shown in FIG. 4E. The greater the horizontal distance D, the better the stiffness of the composite barrier film 400.

In one embodiment, as shown in FIG. 4D, a D value of the stiffness of the composite barrier film 400 is not less than 7.8 cm.

In one embodiment, the protection film is made of one of the following materials: PP, PE, PP & PE, PET, and PC.

In one embodiment, wherein the quantum-dot film comprising a binder and a plurality of quantum dots dispersed in the binder, wherein the plurality of quantum dots are capable of being water-resistant and oxygen-resistant, wherein the ultra-thin barrier film is a food packaging film.

In one embodiment, the thickness of the quantum-dot film is in a range of 25-350 um.

In one embodiment, the binder comprises at least one of the following: PET (polyethylene terephthalate), PEN (polyethylene naphtholate), PAR (polyacrylate), PC (polycarbonates), and TAC (cellulose triacetate).

Figure 5:
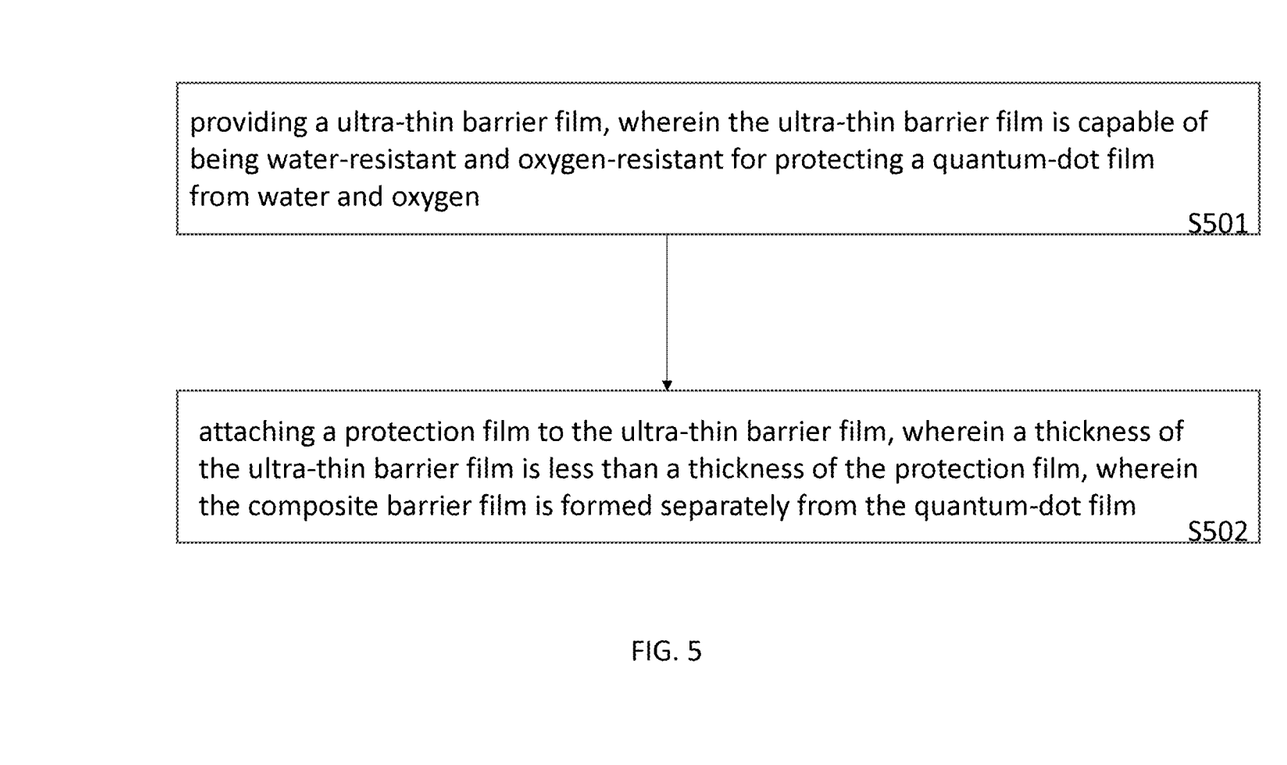
FIG. 5 illustrates a method for forming a composite barrier film.

FIG. 5 illustrates a method to form a composite barrier film for attaching to a quantum-dot film, said method comprising: step S501: providing an ultra-thin barrier film, wherein the ultra-thin barrier film is capable of being water-resistant and oxygen-resistant for protecting the quantum-dot film from water and oxygen; and step S502: attaching a protection film to the ultra-thin barrier film, wherein a thickness of the ultra-thin barrier film is less than a thickness of the protection film, wherein the composite barrier film is formed separately from the quantum-dot film.

In one embodiment, an adhesive material is on the bottom surface of the protection film to adhere the protection film to the ultra-thin barrier film.

In one embodiment, an adhesive film is attached to the bottom surface of the protection film to adhere the protection film to the ultra-thin barrier film.

In one embodiment, the thickness of the ultra-thin barrier film is in a range of 5-25 um, and the thickness of the protection film is in a range of 40~100 um.

In one embodiment, the thickness of the ultra-thin barrier film is in a range of 5-25 um, and the thickness of the protection film is in a range of 60~70 um.

In one embodiment, the protection film comprises PET (polyethylene terephthalate).

In one embodiment, the protection film comprises PP.

In one embodiment, the ultra-thin barrier film is a food packaging film that is capable of being water-resistant and oxygen-resistant.

In one embodiment, the ultra-thin barrier film is a barrier film that is capable of being water-resistant and oxygen-resistant.

In one embodiment, the protection film is made of one of the following materials: PP, PE, PP & PE, PET, and PC.

In one embodiment, a method to form a composite barrier film for attaching to a quantum-dot film, said method comprising: choosing an ultra-thin transparent film (PET or other plastic films) with a thickness of 5-25 um, which has the characteristics of water and oxygen barrier as a quantum dot film barrier layer, such as barrier film or food packaging film. Since the quantum dot film itself has the effect of blocking water and gas, the food packaging film of the present invention can strengthen the prevention of water and oxygen corrosion; choosing a protective film with moderate viscosity and a thickness of 40~100 um. The base material of the protective film is PP, PE, PP & PE, PET, PC; and pasting the protection film directly on the PET surface of the ultra-thin barrier film, and use the protection to increase the stiffness of the barrier film. The schematic diagram of the bonding and the schematic diagram of the structure after bonding are as shown in FIG. 4B.

Figure 6:
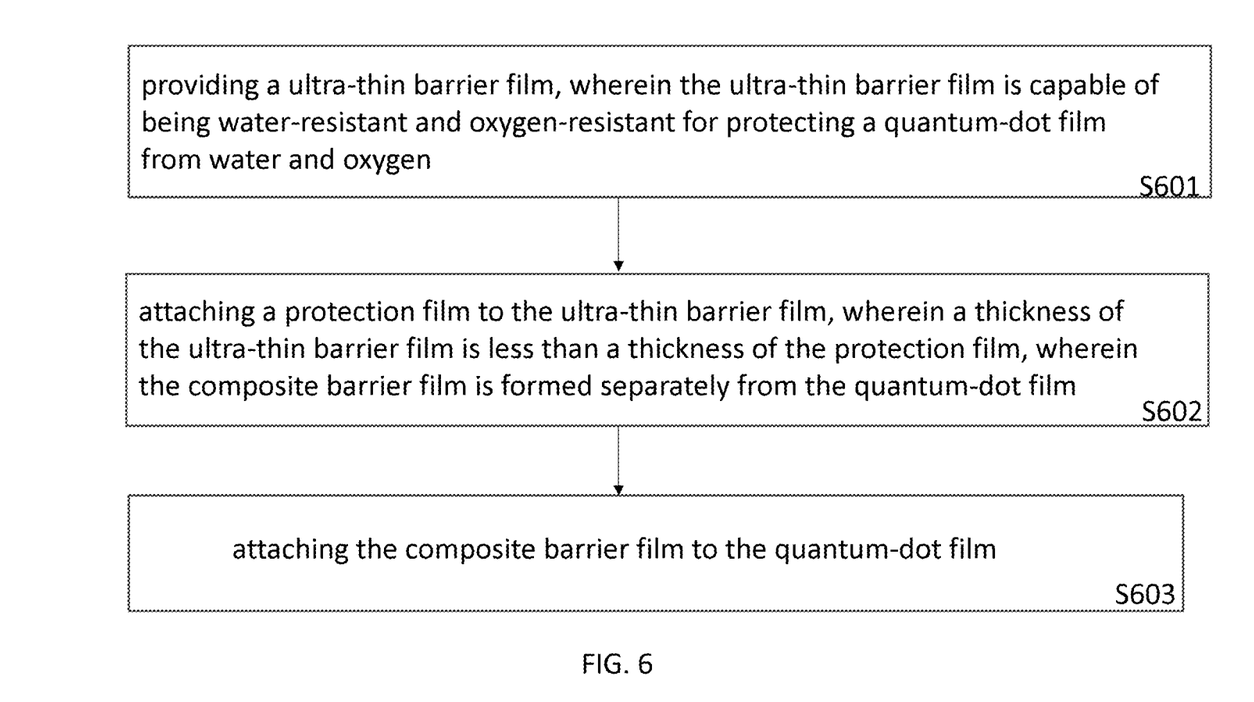
FIG. 6 illustrates a method for forming a composite barrier film.

FIG. 6 illustrates a method to form a composite quantum-dot film, said method comprising: step S601: providing an ultra-thin barrier film, wherein the ultra-thin barrier film is capable of being water-resistant and oxygen-resistant for protecting the quantum-dot film from water or oxygen; step S602: attaching a protection film to the ultra-thin barrier film to form the composite barrier film, wherein a thickness of the ultra-thin barrier film is less than a thickness of the protection film, wherein the composite barrier film is formed without using the quantum-dot film; and step S603: attaching the composite barrier film to the quantum-dot film.

In one embodiment, an adhesive material is on a bottom surface of the protection film so as to adhere the protection film to the ultra-thin barrier film.

In one embodiment, an adhesive film is attached on a bottom surface of the protection film to adhere the protection film to the ultra-thin barrier film.

In one embodiment, the thickness of the ultra-thin barrier film is in a range of 5-25 um, and the thickness of the protection film is in a range of 40~100 um.

In one embodiment, the thickness of the ultra-thin barrier film is in a range of 5-25 um, and the thickness of the protection film is in a range of 60~70 um.

In one embodiment, the protection film comprises PET (polyethylene terephthalate).

In one embodiment, the protection film comprises PP (polypropylene).

In one embodiment, the ultra-thin barrier film is a food packaging film that is capable of being water-resistant and oxygen-resistant.

In one embodiment, the protection film is made of one of the following materials: PP, PE, PP & PE, PET, and PC.

The ultra-thin film with improved stiffness is processed by coating, laminating, and QD film production in the later stage. Because the protective film can increase the stiffness, it can solve the process of high-temperature stretch lines, warpage, wrinkles, etc. problems, and can increase the speed of the production, and the protection film on the back can avoid scratches on the back.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A composite barrier film for attaching to a quantum-dot film, said composite barrier film comprising:
    a unitary barrier film, wherein the unitary barrier film is water-resistant and oxygen-resistant for protecting the quantum-dot film from water or oxygen; and
    a protection film, wherein the protection film is attached to the unitary barrier film to increase the stiffness of the unitary barrier film, wherein a thickness of the unitary barrier film is less than a thickness of the protection film.

2. The composite barrier film according to claim 1, wherein an adhesive material is on a bottom surface of the protection film to adhere the protection film to the unitary barrier film.

3. The composite barrier film according to claim 1, wherein an adhesive film is attached on a bottom surface of the protection film to adhere the protection film to the unitary barrier film.

4. The composite barrier film according to claim 1, wherein the thickness of the unitary barrier film is in a range of 5-25 um, and the thickness of the protection film is in a range of 40~100 um.

5. The composite barrier film according to claim 1, wherein the thickness of the unitary barrier film is in a range of 5-25 um, and the thickness of the protection film is in a range of 60~70 um.

6. The composite barrier film according to claim 1, wherein the protection film comprises PET (polyethylene terephthalate).

7. The composite barrier film according to claim 1, wherein the unitary barrier film is a food packaging film that is capable of being water-resistant and oxygen-resistant.

8. The composite barrier film according to claim 1, wherein a D value of the stiffness of the composite barrier film is not less than 7.8 cm.

9. The composite barrier film according to claim 1, wherein the protection film is made of at least one of the following materials: PP, PE, PP & PE, PET, and PC.

10. The composite barrier film according to claim 1, wherein the quantum-dot film comprises a binder and a plurality of quantum dots dispersed in the binder, wherein the plurality of quantum dots are water-resistant and oxygen-resistant.

11. A method to form a composite barrier film for attaching to a quantum-dot film, said method comprising:
    providing a unitary barrier film, wherein the unitary barrier film is water-resistant and oxygen-resistant for protecting the quantum-dot film from water or oxygen; and
    attaching a protection film to the unitary barrier film, wherein a thickness of the unitary barrier film is less than a thickness of the protection film.

12. The method according to claim 11, wherein an adhesive material is on a bottom surface of the protection film to adhere the protection film to the unitary barrier film.

13. The method according to claim 11, wherein an adhesive film is attached on a bottom surface of the protection film to adhere the protection film to the unitary barrier film.

14. The method according to claim 11, wherein the thickness of the unitary barrier film is in a range of 5-25 um, and the thickness of the protection film is in a range of 40~100 um.

15. The method according to claim 11, wherein the thickness of the unitary barrier film is in a range of 5-25 um, and the thickness of the protection film is in a range of 60~70 um.

16. The method according to claim 11, wherein the protection film comprises PET.

17. The method according to claim 11, wherein the protection film comprises PP.

18. The method according to claim 11, wherein the unitary barrier film is a food packaging film that is water-resistant and oxygen-resistant.

19. The method according to claim 11, wherein the quantum-dot film comprising a binder and a plurality of quantum dots dispersed in the binder, wherein the plurality of quantum dots are water-resistant and oxygen-resistant.

20. The method according to claim 11, wherein a D value of the stiffness of the composite barrier film is not less than 7.8 cm.

* * * * *